United States Patent [19]
Louwagie et al.

[11] Patent Number: 5,885,112
[45] Date of Patent: Mar. 23, 1999

[54] COAX CONNECTOR BAY AND DRAWER

[75] Inventors: Dominic Louwagie, Eden Prairie; Sastry V. Emani, Bloomington; Todd Allan Morgenstern, Savage; John Gregory Schannach, Eagan, all of Minn.

[73] Assignee: ADC Telecommunications, Inc., Minnetonka, Minn.

[21] Appl. No.: 971,827

[22] Filed: Nov. 17, 1997

[51] Int. Cl.$^6$ ...................................................... H01R 9/22
[52] U.S. Cl. ............................................................ 439/719
[58] Field of Search ...................................... 439/709, 713, 439/715, 719; 361/826, 827, 828, 608, 609, 616

[56] References Cited

U.S. PATENT DOCUMENTS

| | | | |
|---|---|---|---|
| 3,665,377 | 5/1972 | MacKenzie, Jr. ........................ | 439/713 |
| 4,752,249 | 6/1988 | Unger et al. ............................. | 439/719 |
| 4,764,849 | 8/1988 | Khan ........................................ | 361/428 |
| 4,824,403 | 4/1989 | De Luca et al. ......................... | 439/714 |
| 5,497,444 | 3/1996 | Wheeler ................................... | 385/135 |
| 5,548,489 | 8/1996 | Reed et al. .............................. | 361/827 |

OTHER PUBLICATIONS

Exhibit 1 Photographs of a Siemens product.
Exhibit 2 Photographs of a Phillips product.
Exhibit 3 Photographs of an Ericsson product.

*Primary Examiner*—Neil Abrams
*Assistant Examiner*—Barry M. L. Standig
*Attorney, Agent, or Firm*—Merchant, Gould, Smith, Edell, Welter & Schmidt, P.A.

[57] ABSTRACT

A coax connector bay and drawer maintain cable routing along sides of vertical array of drawers. When in a closed position, the drawers have access opening on opposite sides of the drawers to permit cables to be routed along the sides of the drawers and into the access openings for coupling to coax couplers. The drawers are slidable to open positions to permit a technician to have access to an interior of the drawers.

15 Claims, 5 Drawing Sheets

COAX CONNECTOR BAY AND DRAWER

BACKGROUND OF THE INVENTION

1. Field of the Invention

This invention pertains to frames and associated bays for use in the telecommunications industry. More particularly this invention pertains to a bay for providing connection between coaxial cables.

2. Description of the Prior Art

In the telecommunications industry, high frequency signals are commonly transmitted across coax cables. From time to time, such cables must be interconnected. For example, it is desirable to provide an interconnection point between two pieces of telecommunications equipment to provide a convenient location in a telecommunications system for accessing signals as well as monitoring signals from time to time.

Locations for interconnecting coaxial cables are commonly housed in large fixtures referred to as a "bay." Such bay will have multiple locations for interconnecting coaxial cables. As a result of the multiple locations, the organization of the coax connector bay becomes important to avoid an unwieldy jumble of cables. It is also desirable that such bays have sufficient flexibility to permit functional modifications over time to permit monitoring of signals as desired as well as access to cables.

SUMMARY OF THE INVENTION

According to a preferred embodiment of the present invention, a coax connector bay is disclosed including a frame and a plurality of drawers which slide within the frame. Each of the drawers together with the frame include cooperating members to define unobstructed first and second horizontal access openings to interiors of the drawers along first and second horizontal access directions which are perpendicular to an axis along which the drawers slide between open and closed positions. The drawers and frame further include cooperating members which obstruct access to the interiors other than through the horizontal access directions when the drawers are in the closed positions and which permit unobstructed access to the interior of the drawers when the drawers are in an open position. At least one coax coupling is carried on a drawer. The coax coupling is positioned within an interior of the drawer and has first and second coax connectors positioned to couple with coax cables which are passed through the first and second horizontal access openings, respectively, of the drawer.

DETAILED DESCRIPTION OF THE PREFERRED EMBODIMENT

With reference now to the various drawing figures which identical elements are numbered identically throughout, a description of the preferred embodiment of the present invention will now be provided.

Figure 1:
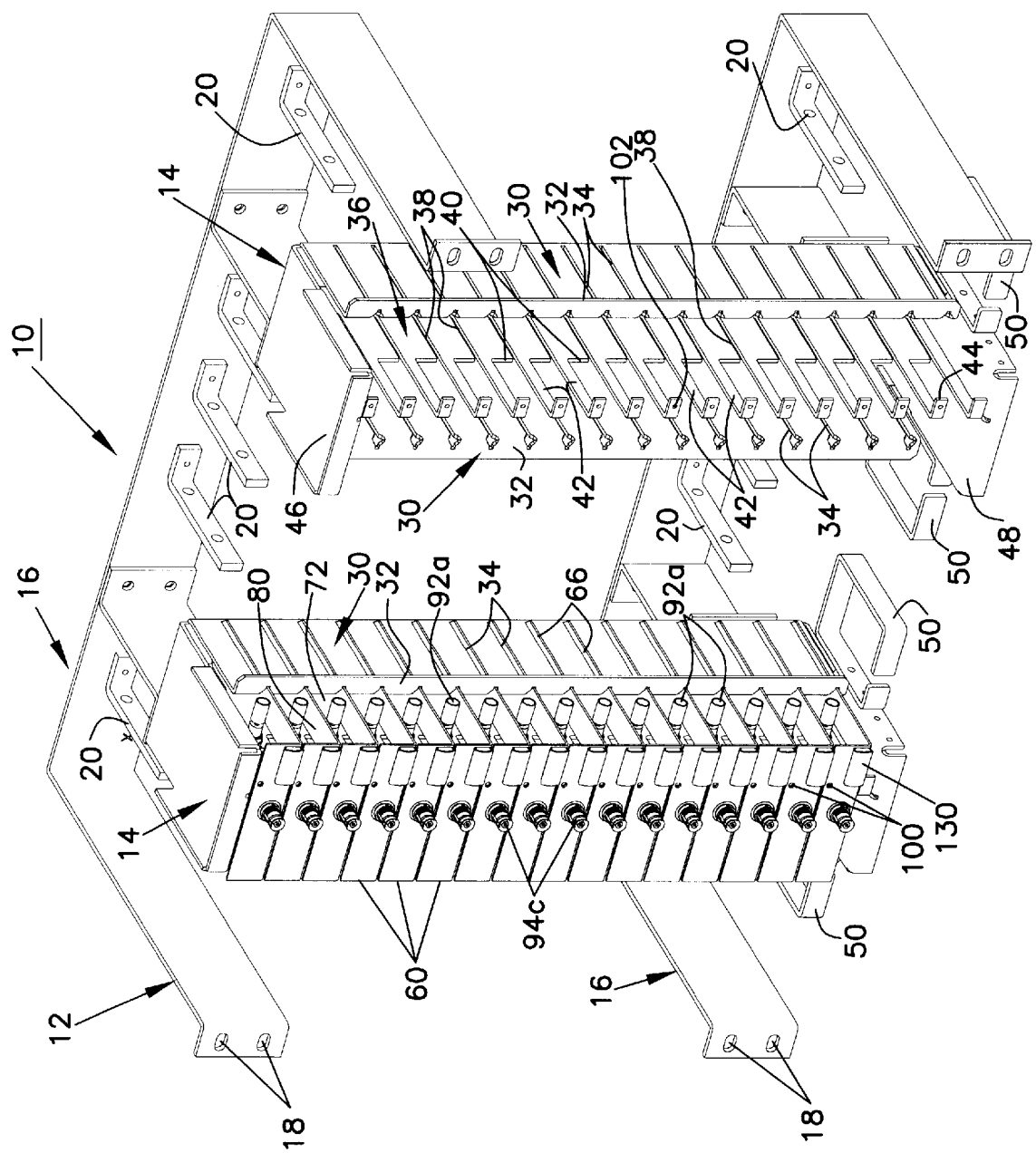
FIG. 1 is a front, top and right side perspective view of a coax connector bay according to the present invention showing a frame of the present invention showing one half of the frame completely loaded with drawers according to the present invention.

In FIG. 1, a connector bay 10 is shown including a frame 12. In the embodiment shown, the frame 12 includes two chassis 14. Each of chassis 14 is identical and a description of one will suffice as a description of the other.

The chassis 14 are vertically supported by the frame 12 and the chassis 14 are separated by a horizontal spacing to permit a technician to have access between the chassis 14 for reasons that will become apparent. The chassis 14 are supported by horizontal support structures 16 having mounting holes 18 for mounting the frame 12 to an equipment chassis in a telecommunications center or some other desired location. The frame 12 further includes cable management supports 20 to which bundles of coaxial cables may be secured as desired.

Each of the chassis 14 includes spaced apart and parallel side walls 30 having outwardly protruding flanges 32 at their forward edges. A plurality of horizontally aligned slots 34 are formed through the side walls 30. The slots 34 extend through the flanges 32 and further extend rearwardly through the side walls 30 toward the rear end of the side walls 30.

Each of the chassis 14 further includes an intermediate wall 36 which extends between the side walls 30 and parallel to the side walls 30. The intermediate wall 30 includes a plurality of intermediate slots 38 which are horizontally aligned with the slots 34. The intermediate wall 36 includes a forward edge 40 which is recessed behind the flanges 32. Extending forwardly from the forward edge 40 are a plurality of stop arms 42 which terminate at flanges 44 which are spaced forward from flanges 32. The upper and lower ends of the chassis 14 are provided with cover plates 46 and 48, respectively. Slotted cable guides 50 are secured to the lower cover plates 48 on both sides of each chassis 14 and rearward of the flanges 44.

Figure 2:
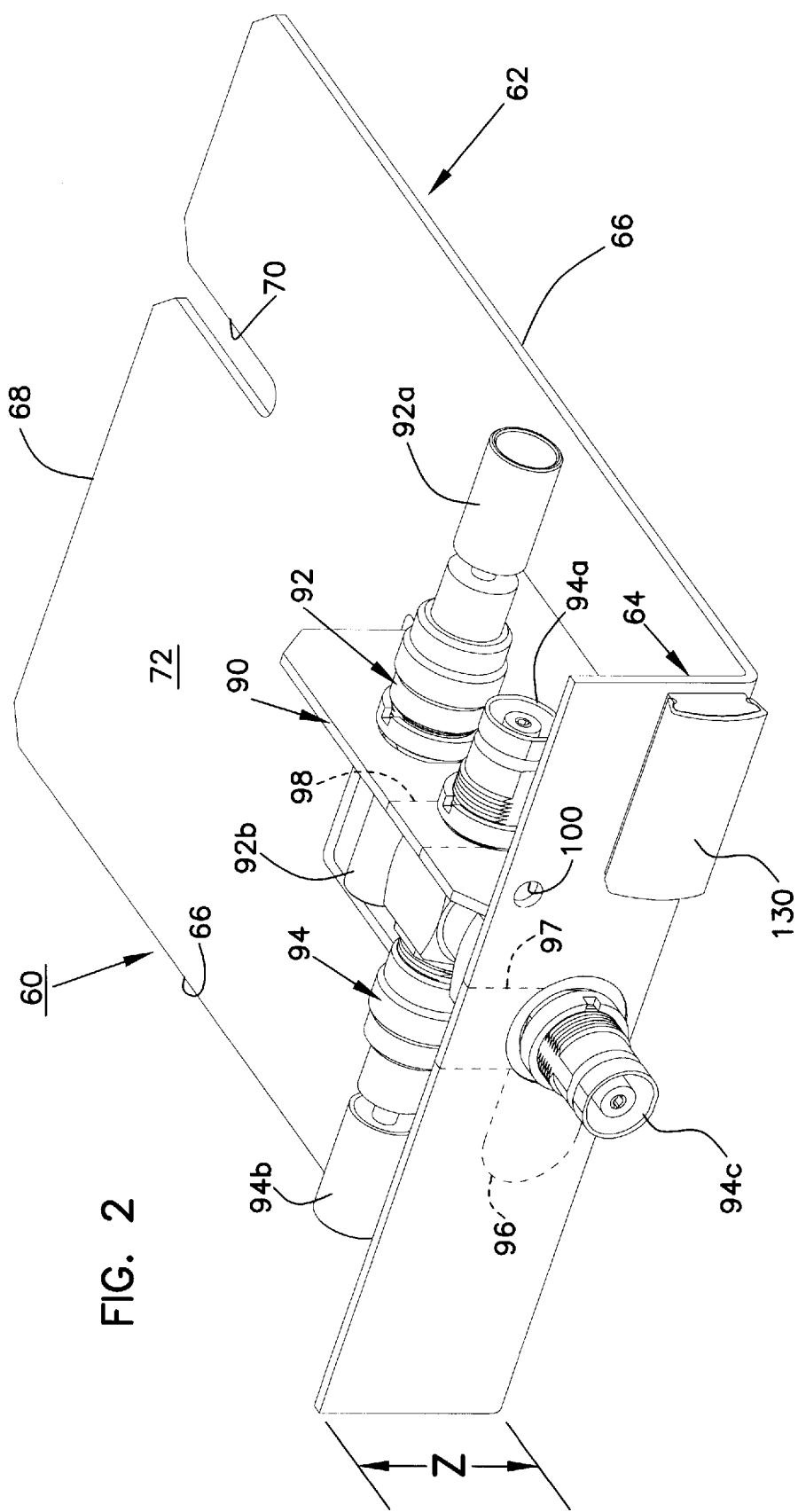
FIG. 2 is a front, top and right side perspective view of a drawer according to the present invention.
Figure 3:
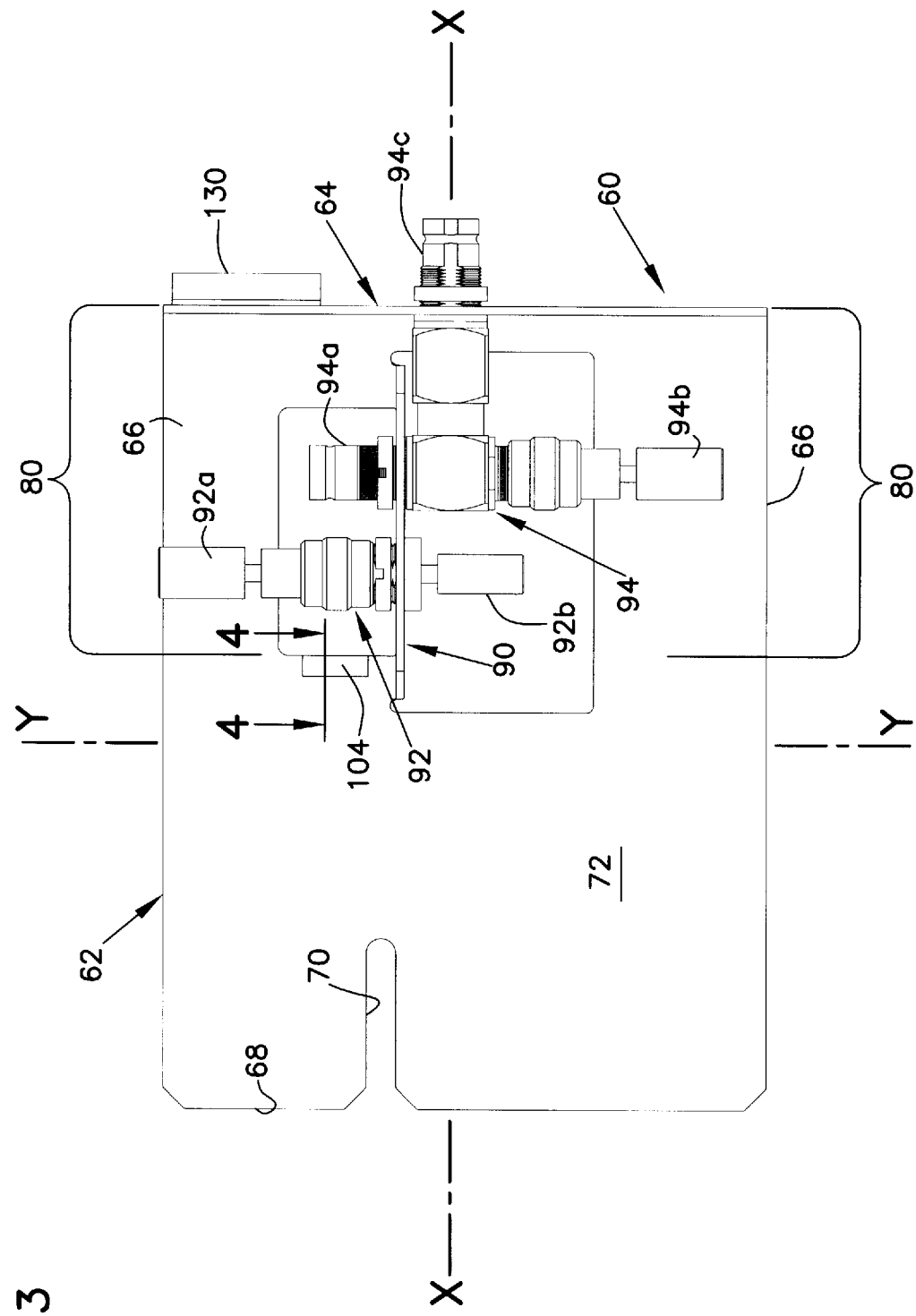
FIG. 3 is a top plan view of the drawer of FIG. 2.

Each of the chassis 14 receives a vertical array of drawers 60. In FIG. 1, the leftmost chassis 14 is completely filled with drawers 60 (each in a closed position). With reference to FIGS. 2 and 3, the drawers 60 include a sheet metal base 62 and an integrally formed forward wall 64 extending upwardly at a 90° angle to the base 62 at a leading edge of the base 62.

The base 62 has a longitudinal dimension X—X illustrated in FIG. 3 as well as a transverse dimension Y—Y. The transverse dimension Y—Y is sized for the side edges 66 of the base 62 to be slidably received within horizontally aligned slots 34 and with the base 62 slidably received within a horizontally aligned slot 38. A rear end 68 of the base 62 is provided with a slot 70 positioned to align with slots 38 of the intermediate wall 36.

When the base 62 is received within horizontally aligned slots 34 and 38, the base 62 rests on a stop arm 42. The forward wall 64 has a height Z to extend from the stop arm 42 upwardly to cover an adjacent flange 44 but stop below the vertical extent of the flange 44 so as not to interfere with positioning of a drawer 60 immediately above an inserted drawer 60. With the drawer 60 inserted within the slots 34, 38, the drawer 60 is slidable along its longitudinal axis X—X between an open and closed position. In FIG. 1, all drawers 60 are shown in a closed position.

The opposing surfaces of the base 62 and forward wall 64 define a drawer interior 72 which is enclosed when the drawers 60 are in the closed position but for an access space on opposite sides of the drawer 60 as shall now be described.

Best shown in FIG. 1, when the drawer 60 is in the closed position, the forward wall 64 abuts the flange 44. Further, a terminal surface of slot 70 abuts a terminal end of slots 38 to stop the rearward movement of the drawer 60 within the slots 34. So positioned, the forward wall 64 of the drawer 60 is spaced from the flanges 32 by a distance equal to the spacing between the flanges 32 and the plane of the flanges 44. This spacing results in access openings 80 into the interior 72 with the access openings 80 positioned on opposite sides of axis X—X when the drawers 60 are in the closed position. The access openings 80 are sized to freely pass coax cables in access directions which are perpendicular to the axis X—X.

The sheet metal construction of the drawer 60 includes an upwardly formed intermediate plate 90 on which are mounted first and second coax couplings 92, 94. Preferably, the couplings 92, 94 are connected to drawer 60 by dielectric washers to prevent electrical connection between couplings 92, 94 and base 62.

Coax coupling 92 includes first and second connectors 92a, 92b which are positioned to couple with coax cables passed through the horizontal access openings 80 when the drawer 60 is in the closed position. Similarly, the second coax coupling 94 includes first and second coax connectors 94a, 94b which are likewise positioned with their axes being perpendicular to the longitudinal axis X—X to couple with coaxial cables passed through the access openings 80. The second coupling 94 further includes a third coax connector 94c extending through the forward wall 64 in a direction parallel with the longitudinal axis X—X. To facilitate assembly of the T-shaped second coupling 94 with drawer 60, an assembly opening 96 or an assembly slot 97 is provided in forward wall 64 adjacent to third coax connector 94c (see FIG. 2). Alternatively, an assembly slot 98 is provided in intermediate plate 90.

Figure 5:
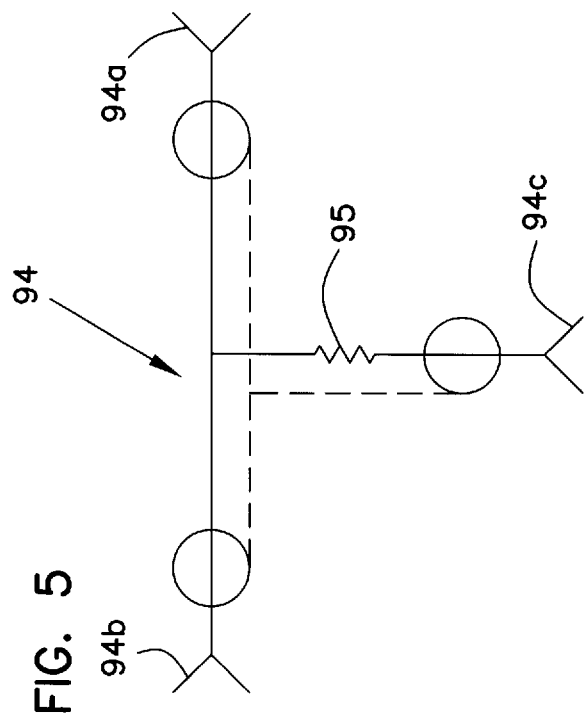
FIG. 5 is an electrical schematic view of a monitor coupling for use with the present invention.

Illustrated schematically in FIG. 5, the third connector 94c is connected to the first and second connectors 94a, 94b across a resistor 95. As a result, when coax cables are connected to connectors 94a, 94b, a signal may pass through the coax cables by passing through connectors 94a, 94b. The signal passing through the connectors 94a, 94b may be monitored by connecting a third coaxial cable to connector 94c. The resistor 95 results in only a portion of the signal being drawn off from passing through connectors 94a, 94b such that the signal may be monitored at connector 94c without interrupting the signal. Other monitor constructions are possible for the second coupling 94, as desired.

While all drawers 60 are shown with a monitor connector 94c, the present invention anticipates that some drawers 60 may have specific applications for interconnection only in which case the second coupling 94 could be replaced by another first coupling 92. It is further anticipated that the drawers 60 could be still further modified by providing tracing lamps, tracing switches, or pinjacks to permit tracing of coax cable connections between two drawers 60.

As shown in FIG. 1, the interiors 72 of the drawers are only accessible through the side access openings 80 when the drawers 60 are in their closed position. Each of the drawers 60 can be individually slid along the direction of axis X—X by pulling forward on the drawer 60 such that the interior 72 of the drawer 60 is now accessible other than through the horizontal access openings so a technician may have easy access to the couplings 92, 94 to effect couplings to the connectors 92a, 92b, 94a, 94b or to replace the couplings 92, 94. When the drawers 60 are returned to the closed position, all cables extend through the side openings 80 with no cables coming through the front of the chassis 14 other than monitor cables which may be connected to the monitor connectors 94c. The cable guides 50 are positioned recessed from the front of the drawers 60 to route cables conveniently to the access openings 80 without having cables extending forward of the drawers 60 in an obstructing manner.

Figure 4:
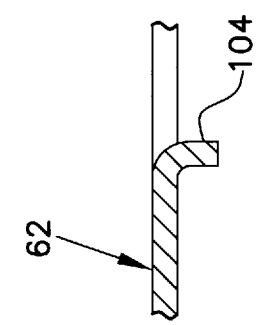
FIG. 4 is a view taken along line 4—4 of FIG. 3.

Each of the forward walls 64 is provided with a through hole 100 which aligns with a threaded hole 102 on flanges 44. As a result, a technician may pass a screw 104 (see FIG. 6) or other fastener through hole 100 into hole 102 to securely fasten the drawer 60 in the closed position. Other locks or captive retainers to selectively secure the drawers 60 in the closed positions are also possible. When opening a drawer 60, it is desirable that the drawer 60 does not easily fall out of the slot 32. As a result, each of the drawers 60 is provided with a downwardly protruding tab 104 (best illustrated in FIG. 4) and positioned to abut flanges 44 when the drawer 60 is slid outwardly to the open position.

Figure 6:
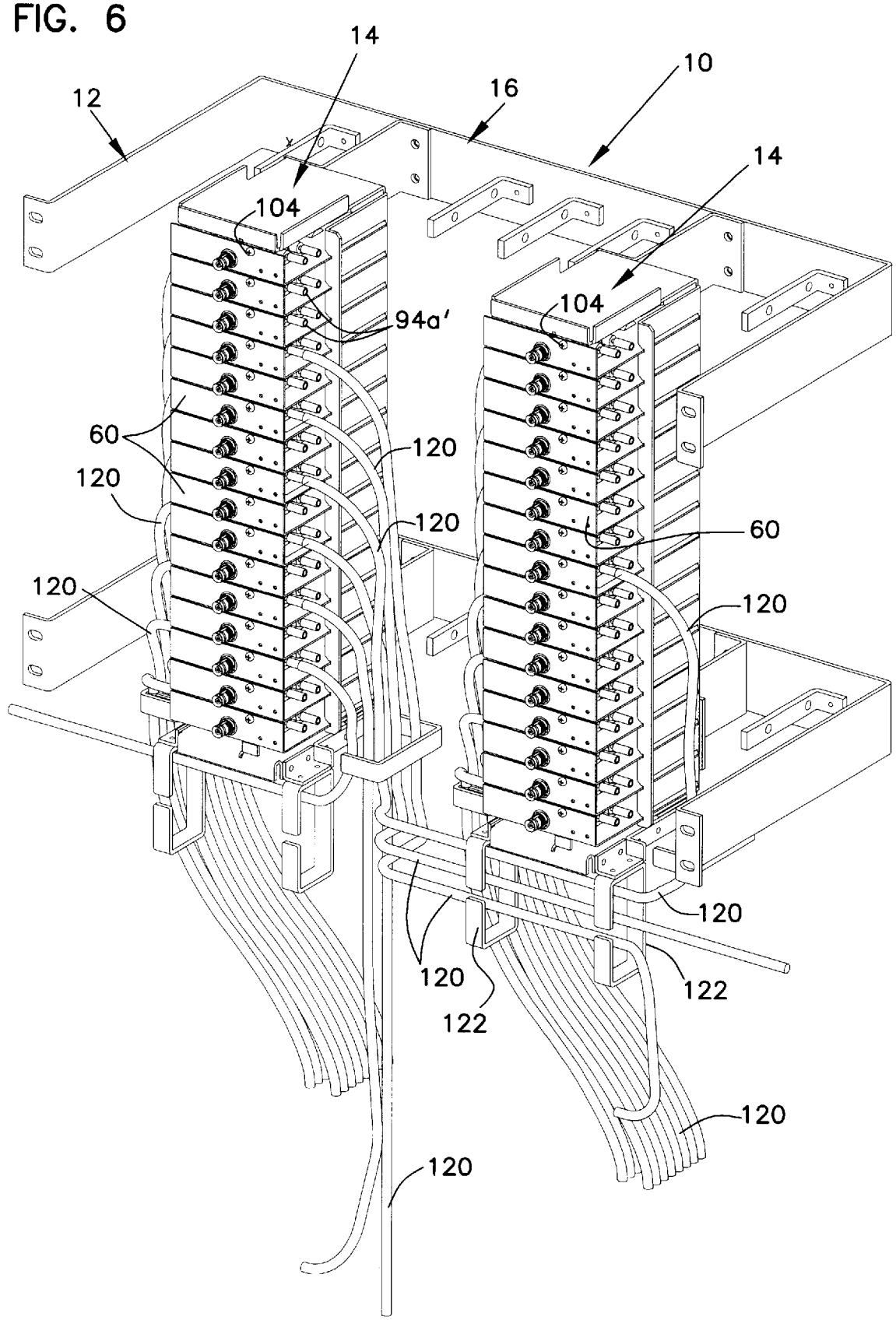
FIG. 6 shows the coax connector bay of FIG. 1 showing the frame completely loaded with drawers, and showing some coax cables coupled to the coax couplings of the drawers.

From the foregoing description, it will be appreciated that the coax connector bay 10 may be fabricated from sheet metal components which are of relatively low cost. The present invention provides enhanced cable management such that normal through connections to connectors 92a, 92b, 94a, 94b are provided with cables extending along the sides of the chassis 14 and positioned rearwardly from the forward walls 64. As a result, in normal operation, there are no jumbles of cables extending over the front of the drawers 60 and which would otherwise interfere with sliding movement of the drawers 60. FIG. 6 illustrates various exemplary cables 120 extending along the sides of each chassis 14. FIG. 6 also shows vertical slotted cable guides 122 for further enhanced cable management. The drawers 60 of FIG. 6 also lack the drawer designators 130 shown in FIGS. 1–3. Also drawers 60 show a different style coax connector 94a' than coax connector 94a of FIGS. 1–3. The present invention is also readily adaptable to enhancements such as the addition of monitor connectors 94c which can permit front access monitoring without the need to open any of the drawers and without interfering with the cabling through the normal through connectors 92a, 92b, 94a, 94b.

Having described the present invention in a preferred embodiment, modifications and equivalents may occur to one skilled in the art. It is intended that such modifications and equivalents shall be included within the scope of the claims which are appended hereto.

We claim:

1. A coax connector bay comprising:

a frame having a plurality of frame guides arranged in a vertical array;

a plurality of drawers each having drawer guides to slidably mate with individual ones of said frame guides and with said drawers slidable along a axis between open and closed positions;

said drawers and said frames including cooperating members to define unobstructed first and second horizontal access openings to interiors of said drawers along first and second horizontal access directions perpendicular to said axis and on opposite sides of said axis when said drawers are in said closed positions, said horizontal access openings sized to freely pass coax cables;

said drawers and frame including cooperating members obstructing access to said interiors other than through said horizontal access directions when said drawers are in said closed positions and permitting unobstructed access through a direction in addition to said horizontal access directions when said drawers are in said open positions;

at least one coax coupling carried on at least one of said drawers within an interior of said drawer and having first and second coax connectors positioned to couple with coax cables passed through said first and second horizontal access openings, respectively, of said drawer.

2. A coax connector bay according to claim 1 further comprising: a second coax coupling carried on said drawer within said interior and having first and second coax connectors positioned to couple with coax cables passed through said first and second horizontal access openings, respectively, and further having a third coax connector exposed through a forward wall of said drawer when said drawer is in either of said open and closed position and positioned to couple with a coax cable extending toward said drawer substantially parallel with said axis.

3. A coax connector bay according to claim 2 wherein:

said third coax connector includes components connected to said first and second coax connectors of said second coax coupling to monitor without interrupting a signal carried across said first and second coax connectors of said second coax coupling.

4. A coax connector bay according to claim 1 wherein:

said coax coupling includes a third coax connector exposed through a forward wall of said drawer when said drawer is in ether of said open and closed position and positioned to couple with a coax cable extending toward said drawer substantially parallel with said axis.

5. A coax connector bay according to claim 4 wherein:

said third coax connector includes components connected to said first and second coax connectors of said coax coupling to monitor without interrupting a signal carried across said first and second coax connectors of said coax coupling.

6. A coax connector bay according to claim 1 wherein:

said frame and said drawers include cooperating members to restrict further movement of said drawers beyond said open positions.

7. A coax connector bay according to claim 1 further comprising a plurality of locks to individually secure said drawers in said closed positions.

8. A coax connector bay according to claim 1 wherein:

said frame includes first and second spaced apart side walls each containing horizontally aligned slots;

said frame further having an intermediate wall between said first and second walls and having an intermediate slot aligned with said slots of said side walls;

each of said drawers including a front wall and a base sized to be slidably received within horizontally aligned ones of said intermediate slots and said side wall slots, opposing surfaces of said base and said intermediate wall positioned to stop said drawers at said closed positions with said front walls spaced from said side walls by a distance to define said horizontal access openings between said front walls and said side walls.

9. A coax connector bay according to claim 8 wherein said intermediate wall includes a plurality of frame members of a plurality of locks.

10. A coax connector bay according to claim 9 wherein:

each of said drawers includes a drawer member lock with individual ones of said frame members when said drawer is in said closed position.

11. A coax connector bay according to claim 8 wherein:

said access openings of said drawers are vertically aligned, said frame including cable guides for routing cables along said frame in alignment with said vertical alignment of said horizontal access openings.

12. A coax connector drawer for a coax connector bay having a frame with first and second spaced apart side walls each containing a plurality of horizontally aligned slots and an intermediate wall between said first and second walls and having a plurality of intermediate slots aligned with said slots of said side walls; horizontally aligned ones of said intermediate slots and said slots of said side walls defining a frame guide, said drawer comprising:

a front wall;

a base extending from said front wall and sized to be slidably received within said intermediate slot and said side walls slots of a frame guide with said drawer slidable along a axis between open and closed positions;

opposing surfaces of said base and said intermediate wall positioned to stop said drawer at said closed position with said front wall spaced from said side wall by a distance to define unobstructed first and second horizontal access openings to an interior of said drawer along first and second horizontal access directions perpendicular to said axis and on opposite sides of said axis when said drawer is in said closed position, said horizontal access openings sized to freely pass coax cables;

at least one coax coupling carried on said drawer within said interior and having first and second coax connectors positioned to couple with coax cables passed through said first and second horizontal access openings, respectively.

13. A coax connector drawer according to claim 12 further comprising:

a second coax coupling carried on said drawer within said interior and having first and second coax connectors positioned to couple with coax cables passed through said first and second horizontal access openings, respectively, and further having a third coax connector exposed through a forward wall of said drawer when said drawer is in either of said open and closed position and positioned to couple with a coax cable extending toward said drawer substantially parallel with said axis.

14. A coax connector drawer according to claim 13 wherein:

said third coax connector includes components connected to said first and second coax connectors to monitor without interrupting a signal carried across said first and second coax connectors.

15. A coax connector drawer according to claim 12 wherein:

said intermediate wall includes a frame member of a lock, said drawer further comprising a drawer member of a lock positioned to lock with said frame member when said drawer is in said closed position.

* * * * *